June 14, 1955  E. C. THOMPSON  2,710,594
POULTRY DRINKING VALVE
Filed Feb. 24, 1953
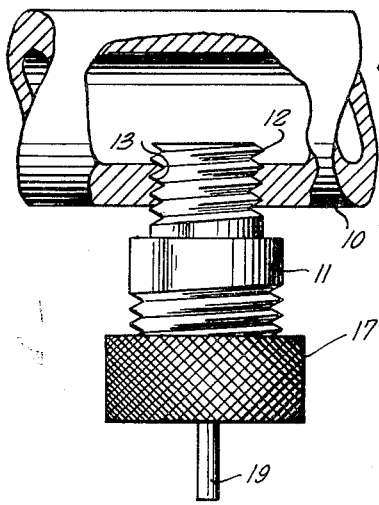
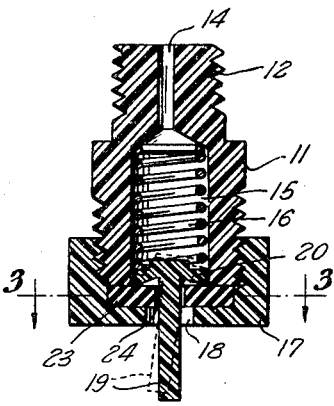
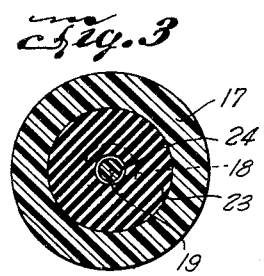
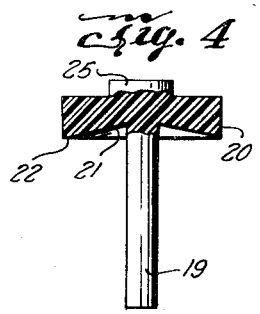
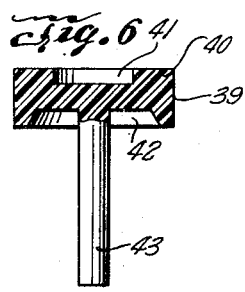
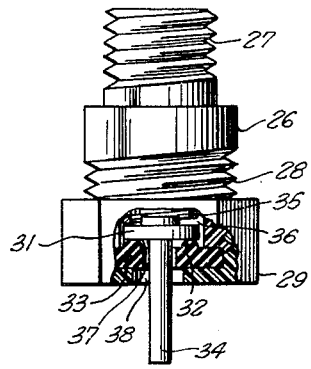
EARL C. THOMPSON
INVENTOR.
BY
ATTORNEY

United States Patent Office 2,710,594
Patented June 14, 1955

2,710,594

POULTRY DRINKING VALVE

Earl C. Thompson, Waco, Tex.

Application February 24, 1953, Serial No. 338,299

1 Claim. (Cl. 119—72.5)

This invention relates to water dispensing equipment for poultry and more particularly to an improved drinking fountain or valve for releasing water as needed by individual fowls.

The principal object of the invention is to provide a valve for a poultry water distributing system which is preferably constructed chiefly of plastic material and designed to accommodate all species of domestic fowl, including those whose beaks have been truncated to prevent cannibalism, by virtue of the provision in the valve of a stem which can be actuated laterally as well as vertically regardless of the condition of the beak of the fowl. Fowls whose beaks have been operated on to discourage cannibalism cannot, with any degree of effectiveness, actuate valves of gravity watering systems whose valves are limited to vertical displacement.

Another object of the invention resides in the particular construction of the valve and housing with a view to economy but essentially with regard to efficiency of operation, the valve per se and its seat being designed to provide a positive seal against escape of water, except when actually operated by the fowls, irrespective of the comparatively large opening in the seat to accommodate the stem for ready oscillative or lateral displacement as well as vertical movement.

Broadly, the invention seeks to improve for more extended use a gravity feed valve for poultry watering systems wherein several such valves are relatively spaced along a water conduit having communication with a reservoir from which water is transported by gravity to the individual valves through the conduit, the valves each being so designed and constructed that the fowls may tilt the valve on its seat by pecking at the stem thereof, thus releasing amounts of water within the ability of the fowl to consume it, hence, obviating waste and preventing unsanitary conditions within the poultry enclosure.

With the foregoing and other objects in view, the invention has particular reference to certain features of accomplishment which will become manifest as the description proceeds, taken in connection with the accompanying drawings wherein:

Figure 1 is a fragmentary view of a water supply conduit, partly broken away and showing in elevation, a poultry drinking valve constructed according to the invention.

Figure 2 is a view of the valve in vertical section taken on a plane passing through the vertical longitudinal axis of the valve assembly of Figure 1.

Figure 3 is a transverse sectional view taken on line 3—3 of Figure 2.

Figure 4 is a detail view, partly in section, showing on a larger scale the valve shown in Figure 2.

Figure 5 is a side elevational view of a valve housing, partly in section and showing a slightly modified form of valve and seat, and Figure 6 is a detail view, partly in section of another modification of the valve per se.

Continuing with a more detailed description of the drawing, reference is made primarily to Figures 1 to 4, inclusive, wherein numeral 10 denotes a water distributing conduit to show the relationship therewith of the invention embodied in the drinking valve which consists of the valve body or housing member 11 having a threaded upper portion 12 receivable in a threaded opening 13, of which there are several in longitudinally spaced relationship in the conduit 10. The body member 11 further has an axial water passage 14 which is in communication with an axial bore 15 in the body member and which is of greater diameter than the water passage 14 to accommodate a coil spring 16.

The lower portion of the valve body member 11 is threaded to be received by a valve and seat retaining cup 17 whose outer surface may be either knurled or hexagon shaped for convenience in assembling. The cup 17 has a centrally located opening 18 therein through which extends the stem 19 of the valve 20. The valve head, in the form shown in Figures 2 and 5, has an annular dish-shaped cavity 21 in its undersurface surrounding the stem 19 to reduce its perimeter to a substantially narrow area 22 that portion of the head which is actually in contact with the seat 23.

The valve seat 23 is made of a rubber material possessing greater immunity from the deteriorating effects of water than natural rubber and is held in position in the valve body by its being clamped at its perimeter between the retainer cup 17 and the lower end of the body member 11. A central opening 24 is made in the washer forming the valve seat 23 through which the stem 19 of the valve passes to extend downwardly out of the valve body for accessibility to poultry.

The diameter of the head of valve 20 is sufficiently less than the diameter of the bore 15 of the body member 11 and the diameter of the stem 19 is substantially half that of the opening 18 to allow for tilting action of the valve. However, displacement of the valve is resisted by the coil spring 16 whose lower end rests upon the head of the valve and embraces a prominence 25 centrally located on the head to maintain centered relationship between the spring and head. The upper end of the spring 16 bears against the upper end of the bore 15.

In Figure 5 is shown a valve body consisting of a body member 26, threaded at 27 for reception by a water distributing pipe such as at 10 in Figure 1, and further provided with a lower threaded portion 28 on which is mounted a valve seat retaining cup 29. The valve body per se as shown in Figure 5 is identical to that illustrated in Figures 1 and 2 except for the hexagon shaped cup 29, but the valve seat 30 and valve 31 are of slightly different construction than the valve and seat of the earlier described valve structure.

In the modified form of the invention, the head of valve 31 has parallel top and bottom surfaces, the latter resting on an annular rib 32 formed on one face of the rubber seat 33, thus to afford a better seal against escape of water, yet enabling the valve head to be tilted by slight pressure imposed on its stem 34 as may be imposed by a fowl pecking at the stem. A coil spring 35 bears against the upper surface of the head of valve 31 and its upper end, as in Figure 2, bears against the top of the axial bore 36 in body member 26 with which communicates the axial water passage, not shown, but similar to the showing in Figure 2. As in the valve first described, the valve stem 34 extends downwardly and out of the valve body through opening 37 in the seat 33 and opening 38 in the cup 29.

In Figure 6 is shown a view of still another modification of the valve. In this form, the valve 39 has a head 40 in which there is provided a cavity 41 in its top surface to receive the lower end of the spring such as at 16 in Figure 2 and at 35 in Figure 5. An annular cavity 42 is formed in the under surface of the head, from the center of which depends the stem 43.

Manifestly, the construction as shown and described is capable of some modification and such modification as may be construed to fall within the scope and meaning of the appended claims is also considered to be within the spirit and intent of the invention.

What is claimed is:

A poultry operated drinking valve comprising a valve body member having a small axial water passage in one end and an axial bore of greater diameter than said passage extending from the opposite end of said body into communication with said water passage, a cup mounted on the said opposite end of said body member and having a central opening therein, a substantially flat resilient valve seat interposed between and clamped by said body member and cup and having a central opening in register with that of said cup, a circular valve head having an annular cavity in its undersurface and whose perimeter only is engageable with said seat, an integral stem on said head extending downwardly out of said body member loosely through the openings in said seat and cup and of a diameter equal to substantially one-half the diameter of the central opening of said cup, and spring means in said bore biasing said valve for tilting and vertical displacement relative to said seat.

References Cited in the file of this patent

UNITED STATES PATENTS

| | | |
|---|---|---|
| 258,433 | Keith | May 23, 1882 |
| 1,165,673 | Holmes | Dec. 28, 1915 |
| 2,035,693 | Dobrick | Mar. 31, 1936 |
| 2,307,220 | Hewitt | Jan. 5, 1943 |
| 2,369,104 | Frederickson | Feb. 6, 1945 |
| 2,501,252 | Pine | June 6, 1950 |
| 2,541,369 | Kofford | Feb. 13, 1951 |

FOREIGN PATENTS

| | | |
|---|---|---|
| 675,333 | Germany | May 6, 1939 |